Aug. 30, 1960  R. J. HARKENRIDER  2,950,501
METHOD AND APPARATUS FOR INJECTION MOLDING
Filed Feb. 9, 1956  7 Sheets-Sheet 1

INVENTOR.
Robert J. Harkenrider
BY
Mann, Brown & McWilliams
Atty's.

Aug. 30, 1960 R. J. HARKENRIDER 2,950,501
METHOD AND APPARATUS FOR INJECTION MOLDING
Filed Feb. 9, 1956 7 Sheets-Sheet 2

INVENTOR.
Robert J. Harkenrider
BY
Mann, Brown & McWilliams
Attys.

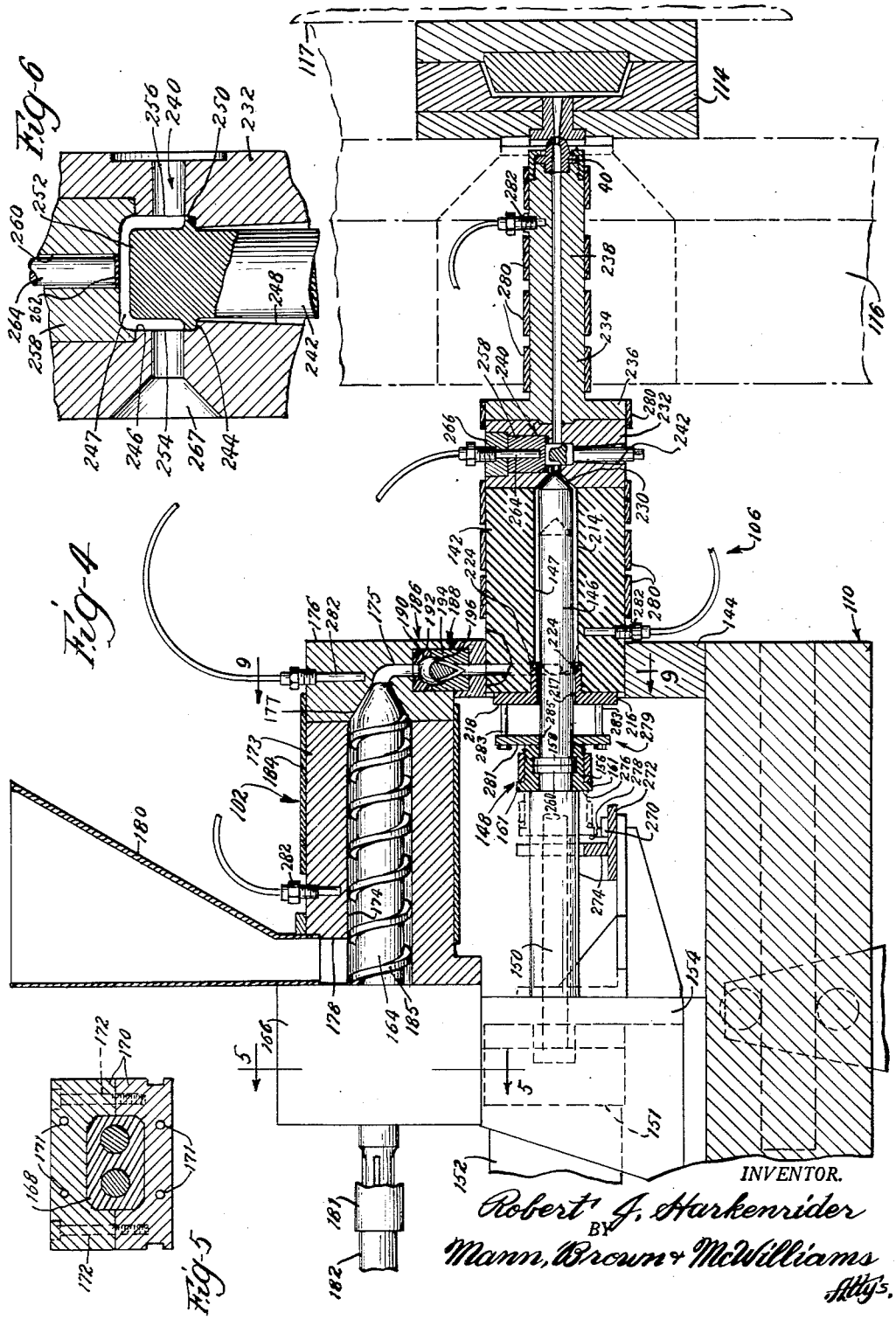

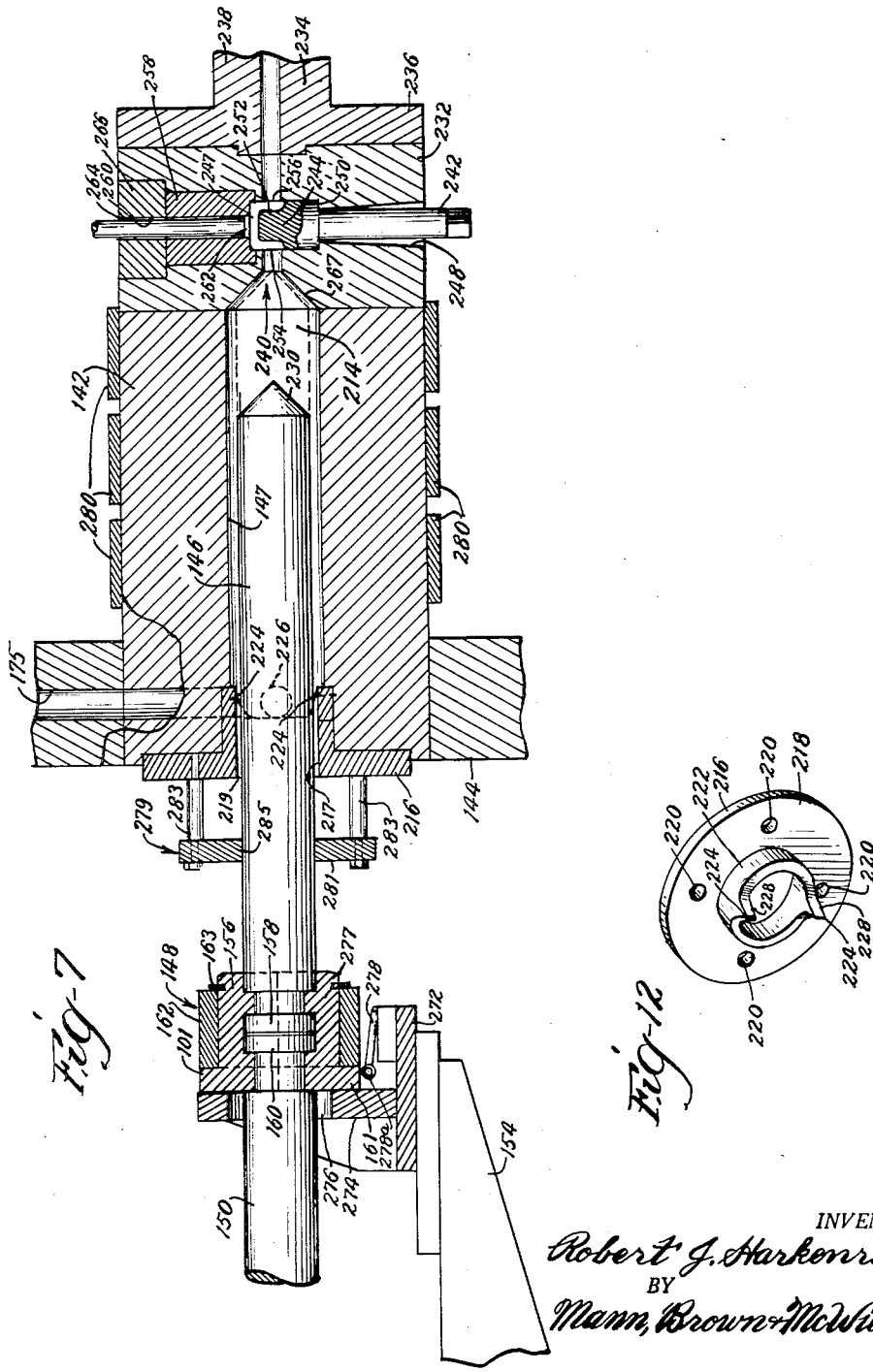

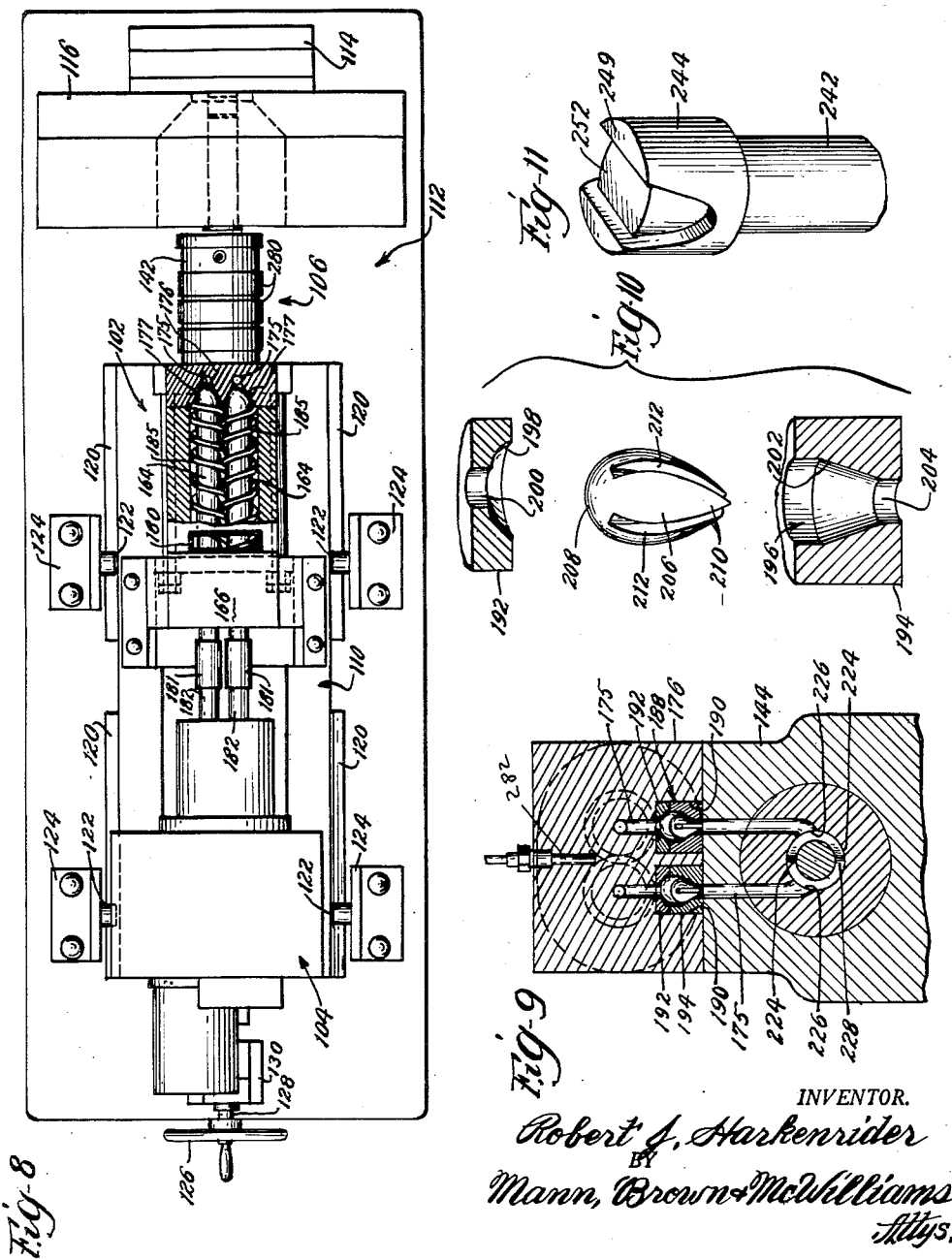

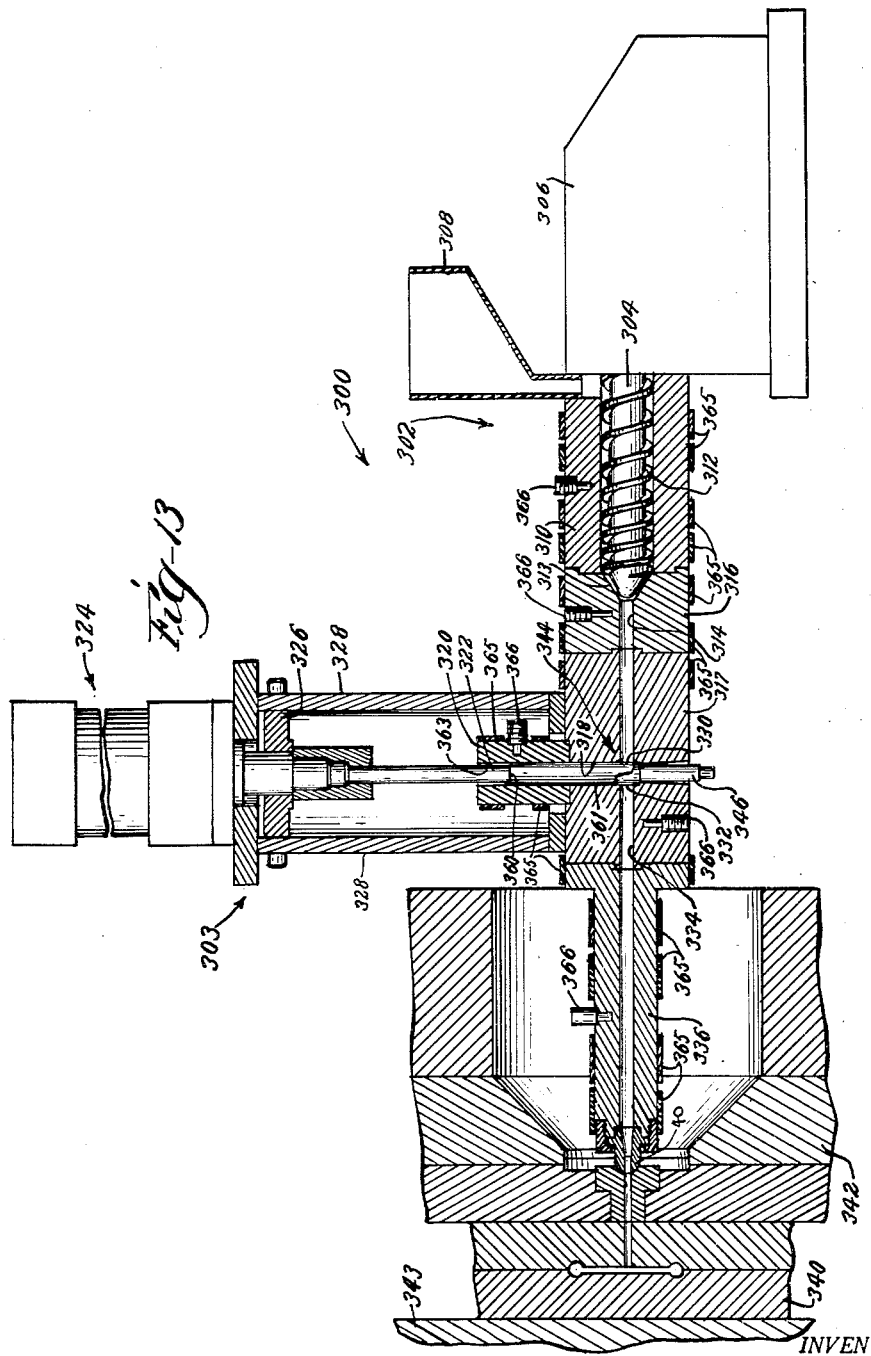

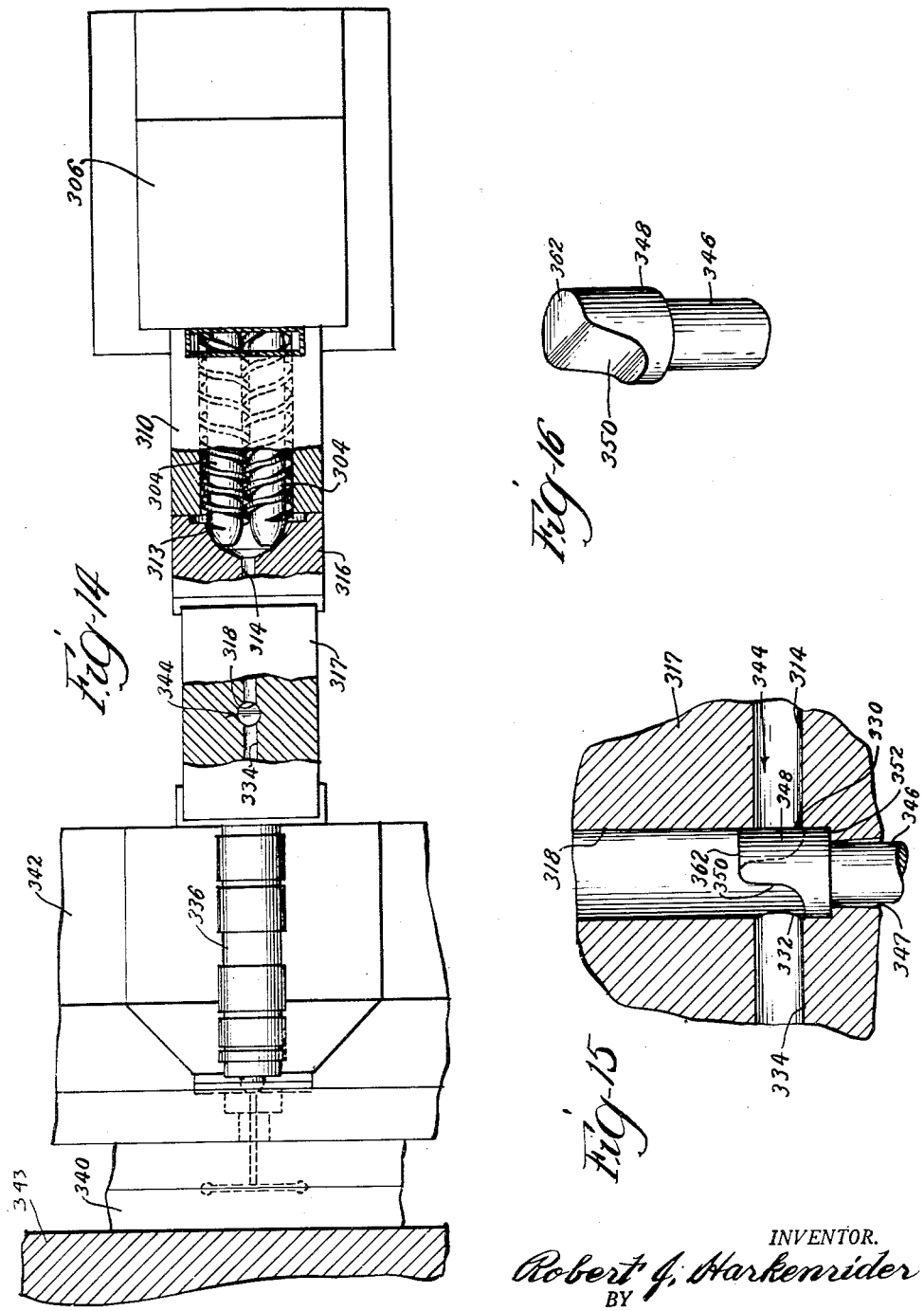

United States Patent Office 2,950,501
Patented Aug. 30, 1960

2,950,501

METHOD AND APPARATUS FOR INJECTION MOLDING

Robert J. Harkenrider, Winona, Minn., assignor to Continental Can Company, Inc., a corporation of New York Filed Feb. 9, 1956, Ser. No. 564,575

10 Claims. (Cl. 18—30)

My invention relates to a method of and apparatus for injection molding of, for instance, plastic molding materials, in which pellets of granular material of this type are preplasticized before the molding material is introduced into the injection chamber, and then the molding material is forced out of the injection chamber by a ram into appropriate molds.

My copending application Serial Number 321,160, filed November 18, 1952, now Patent No. 2,737,686, granted March 13, 1956, of which this application is a continuation-in-part, describes a method and apparatus in which preplasticized molding material is forced into and through the injection chamber in such a manner that "straight through" flow is provided, that is, the molding material moves through the injection molding apparatus without encountering dead spaces or forming stilled pools, and in which the escape of gases entrapped in the molding material is effected. This application incorporates the disclosure of said application, and also includes modified and improved forms of the invention.

As is stated in my said copending application, it has been found that preplasticizing of the molding material or compound before it is inserted into the injection chamber of the molding apparatus reduces the pressure required to force the molding material into the mold, reduces the time required for each molding injection, and increases the capacity of the injection machine. In addition, the number of die cavities for any operation may be increased and the resultant molded product is free of the strains frequently produced in conventional molding.

It is known that gases are generated in conventional methods of preplasticizing of molding material, and that these gases, along with air, become entrained or entrapped in the plasticized molding material. Unless provision is made for the removal of these gases and air, they will be injected into the molds, causing defects in the molded article.

Another of the difficulties involved in the use of preplasticizing methods with the injection cylinders now known is that there is necessarily a volume of air in the injection cylinder before the introduction of the preplasticized molding material. This air must be bled off, and re-entry prevented, in order to prevent it from becoming entrained in the plasticized molding material as the latter is being stuffed into the injection cylinder.

Furthermore, mass production requirements have pointed up the importance of having an injection cylinder and ram arrangement that will provide shots of measured quantity and even consistency.

The principal object of my invention is to provide a method of and apparatus for injection molding in which all the benefits of preplasticizing are retained while at the same time entrapped air and gases are eliminated, or are so reduced in volume as to be harmless, and charring of the plasticized molding material is prevented.

Another object of my invention is the provision of an injection molding method and apparatus in which the return stroke of the ram is effected by the pressure of preplasticized molding material being forced into the injection cylinder and in which this pressure that is exerted on the molding material is effective to remove any gases and air that are entrapped therein.

A further object of my invention is to provide an improved preplasticizing chamber for injection molding machines of this type.

Yet another object of the invention is to provide improved check and rotary valves that materially improve the control of the flow of molding material through the apparatus.

Still another object of the invention is to provide an injection molding apparatus in which the need for a check valve between the injection ram and the preplasticizer chamber is eliminated.

Yet a further object of the invention is to provide injection molding apparatus in which sensitive temperature control is provided, in which the molding material moves through the apparatus in a plastic state in relatively small streams or thin films, and in which the molding material is thoroughly worked as it is preplasticized.

Still a further object of the invention is to provide an improved injection molding apparatus employing the principles of "starved" feeding that provide shots of molding material that, for a desired mold, are equal in quantity.

Other objects, uses and advantages will be obvious or become apparent from a consideration of the following description and the drawings.

In the drawings:

Figure 4 is an enlarged view of the more important components of the apparatus shown in Figure 3, on a larger scale, and with parts shown in section;

Figure 5 is a cross sectional view along line 5—5 of Figure 4;

Figure 6 is an enlarged fragmental view of the rotary valve shown in Figure 4;

Figure 7 is an enlarged fragmental view of the injection cylinder and ram shown in Figure 4;

Figure 8 is a plan view of the apparatus shown in Figure 4, with parts shown in elevation;

Figure 9 is a cross sectional view along line 9—9 of Figure 4;

Figure 10 is an exploded perspective view of the elements comprising an improved valve employed between the preplasticizing chamber and the injection chamber of the apparatus of Figures 3–9;

Figure 11 is a perspective view of the flow blocking element employed in the improved rotary valve employed in the apparatus of Figures 3–9;

Figure 12 is a perspective view (see Sheet 3) of the flow directing element and scraper employed in the injection cylinder of the apparatus shown in Figures 3–9;

Figure 13 is a vertical sectional view through a modified form of injection molding apparatus, parts being shown in elevation;

Figure 14 is a plan view of the apparatus shown in Figure 13, parts being shown in plan;

Figure 15 is a fragmental sectional view illustrating an improved rotary valve employed in the apparatus of Figures 13 and 14; and Figure 16 is a perspective view of the flow blocking element of the valve shown in Figure 14.

Figure 1:
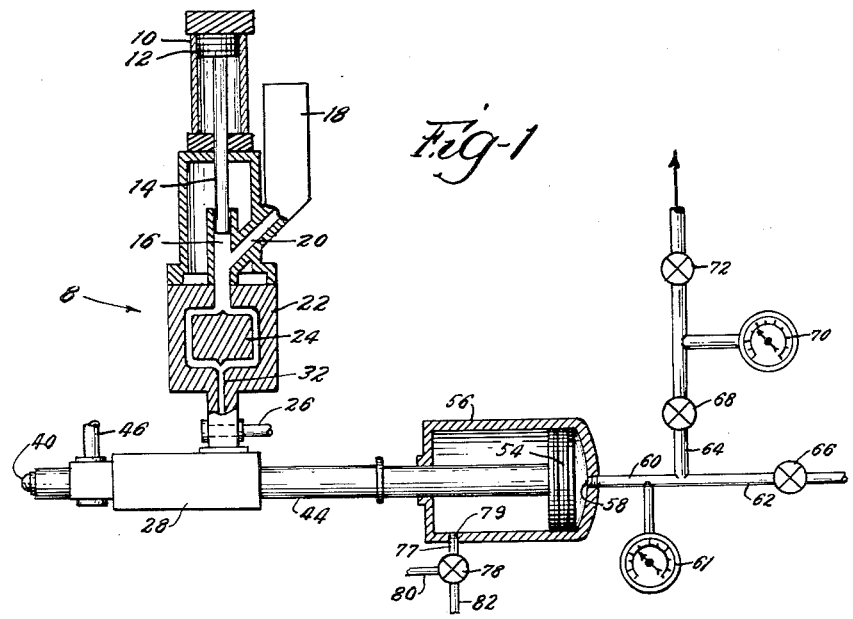
Figure 1 is an elevational, somewhat diagrammatic, view, partially in section, of the injection assembly of one molding machine in which the basic principles of my invention are incorporated, showing one form of preplasticizing apparatus employed in connection therewith.
Figure 2:
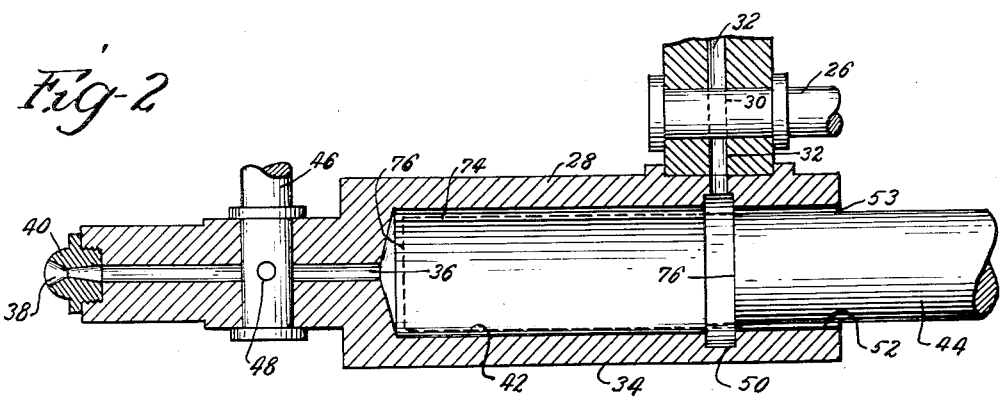
Figure 2 is an enlarged longitudinal cross sectional view of the injection cylinder of the apparatus shown in Figure 1, some parts being shown in elevation.
Figure 3:
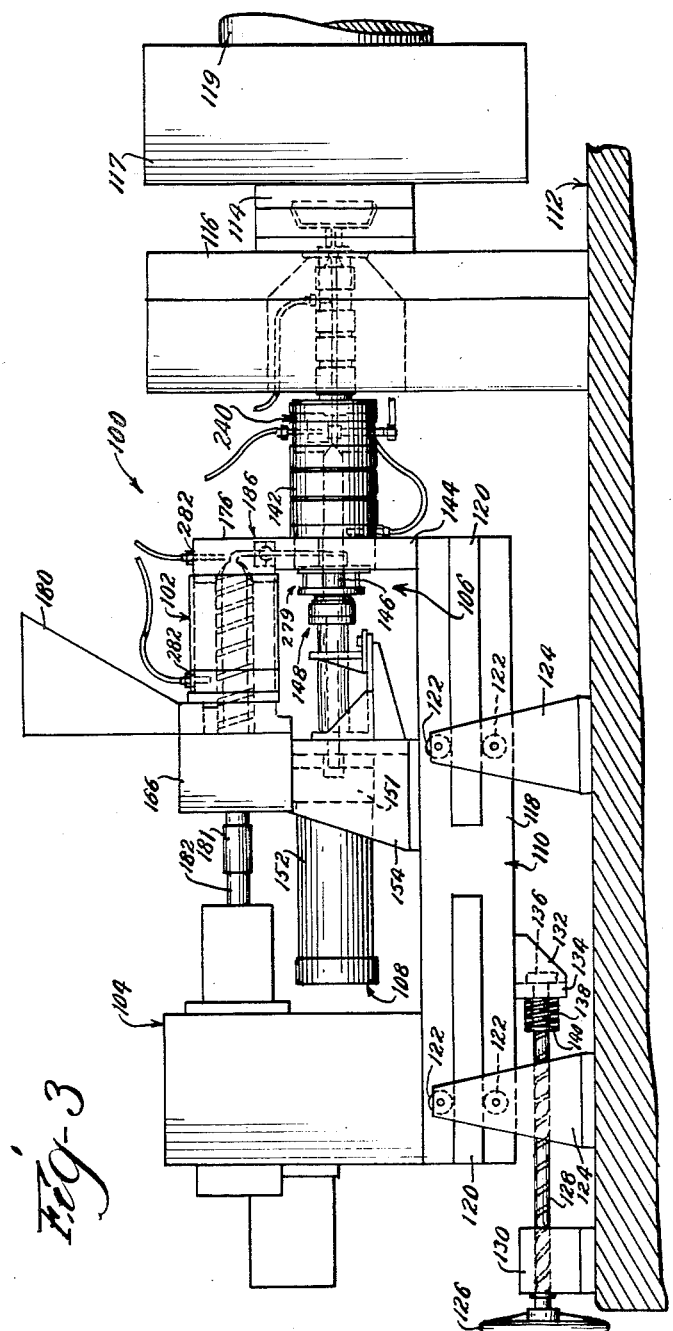
Figure 3 is a side elevational view of another injection molding apparatus or machine in which the principles of my invention have been incorporated, showing an improved form of preplasticizing apparatus employed in connection therewith.

Figures 1 and 2 show a simplified unit 8 that illustrate some of the basic principles of my invention. The injection assembly unit of these figures comprises a stuffer cylinder 10 of any conventional ram type design within which a piston 12 reciprocates. Attached to the piston 12 is a ram 14 extending into a stuffer chamber 16. Adjacent the stuffer chamber is a hopper 18 adapted to feed granular molding material to the stuffer chamber through communicating channel 20. A plasticizing chamber 22 is in communication with stuffer chamber 16 and receives the granular molding material. Chamber 22 has appropriate and conventional heating elements (not shown) and a spreader 24. In accordance with my invention, the molding material is plasticized in this chamber before being fed into the injection cylinder 28.

Between the plasticizing chamber 22 and the injection cylinder 28 is a rotary valve 26 having an orifice 30 (see Figure 2) adapted to be rotated from an open position shown in Figure 2, wherein the plasticized material flows into the injection cylinder 28 through channel 32, to a closed position in which passage of the molding material between the plasticizing chamber 22 and the injection cylinder 28 is prevented. The injection cylinder 28 may be provided with one or more conventional heating elements (not shown) to maintain the molding material in the injection cylinder in a plastic condition.

The injection cylinder 28 has a shell 34 forming an injection chamber, one end of which has a passage 36 therethrough and in communication with an opening 38 in an injection nozzle 40 which is removably secured in the shell 34. A bore 42, that defines an injection chamber is provided in shell 34, within which bore an injection ram 44 is adapted to reciprocate. Between the bore 42 and the injection nozzle 40 is a rotary valve 46 having an opening 48 which is adapted by rotation to open and close communication between the injection nozzle 40 and bore 42 of the injection cylinder. Bore 42 is of a diameter larger than the diameter of the injection ram 44 thus providing a channel to permit the flow of plasticized material between the ram 44 and the cylinder wall (as will be hereinafter more fully explained) and in practice it has been found that a clearance between the side walls of the bore 42 and the ram 44 of from .070 to .150 inch is satisfactory.

Bore 42 may also be provided with an annular recess or pooling area 50 adjacent and in communication with opening 32 leading from the plasticizing chamber to the injection cylinder. The annular recess is of particular significance, as is described hereinafter. The plasticizing chamber 22 may be secured in open communication with the injection cylinder 28 in any suitable manner.

Shell 34 of the injection cylinder has also a second bore 52 forming a continuation of the injection chamber and being of a diameter less than bore 42 and slightly larger than the diameter of the injection ram 44 to provide a clearance or opening 53. It has been found in practice that a clearance between bore 52 and the injection ram of approximately .003 to .010 inch is satisfactory. The space or clearance 53 between bore 52 and ram 44 (clearance 53) provides an escape to atmosphere.

The injection ram 44 is preferably of uniform diameter throughout the effective length in which it operates in the injection cylinder 28 and is usually operated hydraulically by a piston 54 (see Figure 1) reciprocating in a cylinder 56. The hydraulic cylinder 56 is provided with an opening 58 at one end to receive a pipe 60 to provide a supply and exhaust passage for hydraulic fluid under pressure.

Pipe 60 has a high pressure gauge 61 fitted therein and is connected to a conduit 62 which leads to a hydraulic pump (not shown) for supplying oil under pressure and is also connected to conduit 64 to permit the passage of the oil to an oil sump upon return of the piston after a compression stroke.

A quick opening valve 66 is interposed in conduit 62 between the hydraulic pump and the cylinder 56 to open and close communication between the cylinder 56 and the hydraulic pump. A quick opening valve 68 is interposed in conduit 64 to open and close communication between the cylinder 56 and the hydraulic sump. In addition, conduit 64 is provided with a low pressure gauge 70 and an adjustable relief valve 72 adapted to be manually operated to control the rate at which the hydraulic fluid is permitted to escape to the oil sump.

The operation of this injection assembly unit 8 is as follows:

Granular molding material is placed in hopper 18 from which it is fed by gravity through passage 20 into the stuffing chamber 16. Through appropriate controls, piston 12 is caused to reciprocate in cylinder 10, thereby reciprocating stuffer ram 14 which forces the granular material under pressure through the stuffing chamber into the plasticizing chamber 22. While this granular material is being forced through the plasticizing chamber, the spreader and heating elements located therein operate to reduce the granular material to a fluid or plastic state in which condition it is forced under pressure through valve 26 into the injection chamber 42 of injection cylinder 28.

The operation of the injection ram 44 in the injection cycle is very rapid, and for purposes of explanation herein it is assumed that an injection stroke has just been completed and ram 44 is in advanced position shown in dotted lines 74. When in this position, valve 46 is closed, valve 26 is open, valve 66 is closed, valve 68 is open and valve 72 is selectively partially open to accomplish the desired result hereinafter described. By continued operation of the stuffer ram 14, the plasticized material is forced from the plasticizing chamber 22 into the injection cylinder 28 and as it enters the injection cylinder, it encounters the material remaining from the previous injection stroke which fills the clearance between the ram 44 and the walls of the cylinder formed by the bores 42 and 52. By continued operation of the stuffer ram 14, the molding material is forced to flow along chamber 42 to act against the end 76 of the injection ram 44, forcing it to move rearwardly, the plastic material occupying the space from which the ram is moved. By continued operation of the stuffing ram 14, the injection ram 44 and the piston 54 to which it is attached are moved rearwardly to a position where the end 76 of the ram 44 is moved beyond the inlet passage for the molding material. The piston 54 is likewise moved rearwardly the maximum distance of its travel in cylinder 56. In this position the piston and injection ram are properly located for the next injection stroke.

It is necessary in a molding operation to prevent the hot molding material from remaining in the injection chamber long enough for it to become charred. Such charring takes place generally if the molding material remains in the injection chamber for more than two complete cycles. It should be noted that in my construction the plastic molding material flows from the inlet through the clearance between ram 44 and the walls of the bore 42 in a direction toward the discharge opening and occupies the position of the ram as the ram is forced rearwardly. As the ram approaches its retracted position, the incoming molding material acts to wipe off any molding material tending to adhere to the end of the ram. In this construction, the flow of the molding material is progressive and constant toward the discharge end of the injection cylinder and this flow prevents molding material from being "hung up" or charred in the injection chamber. The flow provided by my construction is what may be termed "straight through" flow.

During this procedure wherein the plasticized molding material is fed into the injection cylinder, the rate of travel of the injection ram and consequently the pressure being applied against the end of the injection ram may be controlled by selective operation of the valve 72 the amount of pressure being observed on gauge 70.

As has been stated hereinbefore, it has been noted that gases are generated in the molding material during plasticizing and it is desirable to expel these gases from such material before actual molding takes place. The restricted opening 53 between bore 52 and ram 44 operates to permit the escape of these gases. This opening is in communication with the atmosphere and the forward end of this clearance is located adjacent the inlet channel in which the plasticized molding material enters the injection chamber.

As this molding material enters under a pressure sufficiently high to move the ram 44 rearwardly against a pressure head dictated by the position of the valve 72, the air and entrained gases and a small quantity of plastic material escape through opening 53. The difference in viscosity between the gases and the plastic molding material will, when adequate pressure is maintained in the injection chamber during the stuffing operation, result in the forcing out of the gases through the restricted opening 53. It has been found in practice that these gases escape freely with only a relatively small amount of plastic being exuded from opening 53.

If adequate pressure by operation of control valve 72 is not maintained on the molding material, the entrained gases will not be forced out of opening 53. Alternatively, if the molding material in the injection chamber is subjected to a pressure in excess of that required, the amount of plastic escaping through opening 53 is excessive. The amount of pressure to which the molding material must be subjected by operation of control valve 72 to secure the maximum amount of gas escaping with a minimum amount of plastic leakage varies depending upon the viscosity of the plastic molding material being used. The operation of the valve 72 during the stuffing operation therefore directly affects the amount of gas and molding material escaping through openings 53. In addition, the compression of the molding material by the forward movement of the ram during an injection stroke further acts to force the gas out of the injection cylinder through opening 53.

It will be noted that the channel 32 communicates with the annular recess 50 formed in the injection cylinders. The molding material first fills this recess before spreading into the channels defined by bore 42 and ram 44 and clearance 53, forcing the molding material of the previous shot provided by stuffer ram 14 ahead of it. From this recess 50 the molding material is forced in a substantially annular film toward the nozzle 40 and is spread substantially uniformly about the ram. The annular recess 50 thus defines with the ram 44 a pooling chamber from which the incoming molding material passes evenly distributed toward the forward end of the ram. It should be noted that the channel defined by bore 42 and the ram is of greater cross sectional area than clearance 53, and since the molding material will take the path of least resistance, most of it enters the space defined by bore 42 and ram 44, with only a relatively small portion entering clearance 53.

When the ram and piston 54 have been forced back by the molding material to the rearward position, as shown in Figure 1, valves 26 and 68 are closed, valve 46 is opened, and hydraulic fluid under pressure is admitted to the cylinder 56 by the opening of the valve 66. By virtue of hydraulic pressure acting against the piston 54, injection ram 44 is moved forwardly, forcing the plastic material relatively free from entrained gas and air through channel 36 and nozzle 40 into appropriate molds.

In the usual injection molding machines, the complete molding cycle or "shot" is completed very quickly and for this reason the valves referred to herein, other than valve 72, are operated automatically.

The hydraulic cylinder 56 may also be provided with an additional opening 79 communicating through conduit 77 with a valve 78 which may be rotated in one position to open communication with conduit 80 leading to an oil sump, and in a second position, in communication with conduit 82 leading to a hydraulic pump, and a third position in which conduit 77 is closed from both conduits 80 and 82. The purpose of this arrangement is that if it is desirable to return piston 54 from a forward position in cylinder 56 to the rearward position shown in Figure 1, other than through a stuffing operation, this may be accomplished by opening valve 78 to communication with the hydraulic pump to obtain a supply of hydraulic fluid under pressure to return the piston to the rear position. During the next injection stroke valve 78 is rotated to be in communication with conduit 80 leading to an oil sump. In the normal operation of the injection assembly apparatus 8, valve 78 is in a position such that conduit 77 is in closed communication with conduits 80 and 82.

When the cylinder 28 is initially supplied with molding material by stuffer ram 14, the space defined by bore 42 and ram 44, as well as channel 36, is filled with air. The incoming molding material pushes the air ahead of it, and when molding material appears at the end of nozzle 40, the injection cylinder is filled with molding material. It is recommended that one or two shots then be made before actual production is started.

It will thus be seen that I have provided an injection cylinder for use with molding machines wherein the injection ram is returned from a position where an injection stroke has been completed to a position for the next injection stroke hydraulically by means of the plasticized molding material. The problem of air accumulation in the injection cylinder is thus obviated.

It is also apparent that I have provided an injection cylinder with a clearance between the cylinder and the ram open to atmosphere which permits the escape of gases accumulated in the molding material during the preplasticizing operation. I have also achieved a structure in which the plasticized molding material may be forced into the injection cylinder under controlled pressures, permitting the controlled leakage of gas from the injection cylinder together with a small amount of the molding material.

Turning now to the embodiment of Figures 3–12, reference numeral 100 generally indicates a molding machine in which a number of the above described principles have been incorporated. The machine 100 comprises a twin screw preplasticizing unit 102, the screws of which are actuated by the power unit 104, an injection cylinder and ram unit 106 including a piston and cylinder actuating means 108, all of which are mounted on a slidably supported carriage 110 mounted on a suitable fixed support 112. The injection molding apparatus is arranged to inject molding material into the mold 114, one portion of which is supported by a conventional fixed platen 116, and the other portion of which is fixed to a conventional movable platen 117 actuated by a suitable ram 119.

The carriage 110 may comprise a suitable framework 118 having bars 120 fixed to each side thereof that are supported by rollers 122 rotatably mounted in roller holders or brackets 124 fixed in any suitable manner to the fixed support 112. The carriage 110 and the apparatus supported thereon are moved to the left end to the right by turning the hand wheel 126 keyed to the screw threaded shaft 128 mounted in the screw threaded bracket or block 130 that is fixed to support 112. The shaft 128 is rotatably received in the bracket 132 fixed to the carriage 110, the flange 134 of bracket 132 being positioned between the head 136 of shaft 128 and the spring 138 that abuts a washer 140 or the like fixed to shaft 128. When the hand wheel 126 is rotated to the right of Figure 8 to move the carriage 110 to the right of Figure 3, the nozzle 40 (see Figure 4) of the injection cylinder is moved into engagement with the mold 114, and when this engagement has occurred, further rotation in the same direction urges the shaft 128 further to the right to compress the spring 138 and resiliently urge the nozzle 40 against the mold 114.

The injection cylinder and ram unit 106 comprises an injection cylinder 142 mounted in a base 144 that is fixed in any suitable manner to the carriage 110, and an injection ram 146 that is arranged to reciprocate in the bore 147 (see Figures 4 and 7) of the cylinder, which bore defines the injection chamber of the cylinder. The ram 146 is connected by a coupling 148 to the piston rod 150 of ram actuating means 108, which is fixed to the piston 151 reciprocably mounted in the cylinder 152 corresponding to the cylinder 56 of Figure 1. The cylinder 152 is suitably fixed to brackets 154 fixed to the carriage 110 in any desired manner. The power unit 108 includes conduits and valves (not shown) corresponding to those shown in Figure 1 for actuating the piston 154 thereof. The coupling 148 may comprise a pair of identical semi-circular elements 156 (see Figure 7) that are received about the end flanges 158 and 160 of the ram 146 and piston rod 150, respectively, and are held in assembled relation by the coupling clamp ring element 162 positioned between the flanges 161 of elements 156 and a locking ring 163 of conventional construction received thereon.

The preplasticizing unit 102 generally comprises a pair of oppositely threaded screws 164 mounted in the bearing unit 166 secured to the upper portion of the brackets 154. The bearing unit of the illustrated embodiment may comprise an oilite bearing element 168 (see Figure 5) mounted in bearing caps or frames 170 that are adapted to be held together by suitable bolts received in holes 172 formed therein. A housing 173 formed with an elongate plasticizing chamber 174 is fixed between the bearing unit 166 and an orifice or end plate 176 that is mounted on top of the base 144. The bearing unit 166 is secured to housing 173 by suitable bolts passing through holes 171 formed in unit 166. The screws 164 extend across the chamber 174 and into converging orifices 177 leading to passages 175 that in turn lead to the injection ram unit 106. The housing 173 is formed with an opening 178 in which is mounted a hopper 180 that is adapted to contain pelletized molding material and may be heated in a conventional manner. The screws 164 are respectively connected by, for instance, splined couplings 181, to shafts 182 that are powered by the power unit 104. The couplings are arranged to prevent axial movement of the screws 164 during operation of the preplasticizer unit, but are provided for ease in disconnecting the screws from the respective shafts 182. Preferably the shafts 182 are driven by a fluid motor in which the torque that is transmitted can be limited to prevent the screws from being twisted off. They may also be driven through slip couplings of any conventional type. The housing 173 is preferably provided with a number of conventional heater bands 184 or the like.

The screw threads 185 of the screws 164 in the preplasticizing unit have a ratio of approximately 8 to 1, but the ratio employed will be determined by the nature of the specific molding material used in the machine. They may converge somewhat toward the ends of the screws, as indicated in the drawings.

In the apparatus 100, an improved form of valve 186 has been interposed in the passages 175. The valves 186 are check valves and each valve 186 comprises a housing 188 mounted in approximately formed recesses 190 formed in the orifice plate, each housing 188 including an upper housing element 192 and a lower housing element 194 that together form a tear shaped valve chamber 196 (see Figures 9 and 10). In the illustrated embodiment, the upper housing elements are formed with concavely rounded surfaces 198 about the inlet ports 200 of the valve chambers, and the lower housing elements are formed with the converging surfaces 202 that lead to the outlet ports 204 of these valve chambers. Slidably mounted in each valve chamber is a tear shaped flow blocking element 206 that is formed with a convexly rounded head 208 and a converging end 210. The surface of the elements 206 is formed with four (in the illustrated embodiment) slots 212 that extend from the rounded surfaces of heads 208 to the tips of the converging ends of these elements. Teh slots 212 define with the internal surfaces of the housing elements 192 and 194 channels that extend between the rounded surfaces of the tear shaped valves to the outlet ports thereof. The valve chambers are somewhat longer in length than the flow blocking elements so that these elements will move back and forth therein (up and down in the illustrated embodiment) as direction of flow of the plasticized molding material in passages 175 dictates. It will be noted that no springs or other biasing means are employed to act on elements 206.

Flow blocking elements 206 normally rest in contact with the converging surfaces 202 of the lower housing elements and in this position, the channels of the valves 186 provide communication between the plasticizing chamber and the injection cylinder and ram unit 106. However, when the flow of plasticized molding material backs up into the passages and into the valves 186, the flow blocking elements are moved upwardly, with the rounded surfaces 208 thereof being urged into engagement with the concavely curved surfaces 198 of the housing elements 192, thus sealing off the inlet ports of the valve chambers from the channels thereof and preventing backflow upstream of the check valves 186. The viscosity of the molding material is such that the molding material alone is sufficient to move the flow blocking elements into sealing position and hold them there when back flow exists.

The check valves 186 provide the "straight through" flow that I have found to be so important in injection molding machines. Ball check valves are objectionable for the reason that molding material tends to build up behind or downstream of the ball into a tear shaped eddy or pool which is out of the line of flow of the main stream of molding material. This tear shaped build up tends to chart in due course with consequent adverse effect on the whole operation. The downstream portions of tear shaped elements 206 conform to the lines of flow passed them and prevent the build up of nonflowing molding material.

The injection cylinder 142 and the base 144 are formed with appropriate holes that form part of the passages 175, which lead to each side of the injection chamber 214 formed by the bore 147 of this cylinder that corresponds to bore 42 of the embodiment of Figures 1 and 2. In the apparatus 100, a collar 216, fixed to the rearward end of cylinder 142 by bolts or the like is dimensioned to form the bore 217 of cylinder 142, corresponding to bore 52 of Figure 2 and providing clearance 219, corresponding to clearance 53. The collar 216 (see Figure 12) which also acts as a scraper, comprises a flange 218 appropriately formed with bolt holes 220 and fixed to a sleeve 222 that is formed with diametrically opposed generally triangular projections 224. As shown in Figures 4 and 7, the collar 216 is fixed about the ram in a counter bore formed in cylinder 142 so that the projections 224 are spaced on either side of the inlet ports 226 of the injection chamber 214 (see Figure 9), in which the passages 175 terminate, and the surfaces 228 of these projections direct the flow of plasticized molding material toward the forward end of the ram 146. The sleeve 222 is positioned closely adjacent to the periphery of the ram 146 and the inner end thereof, including the projections 224, acts as a scraper for removing molding material that may adhere to the side surface of the ram. Suitable bolts passing through holes 220 in the collar 216 fix the collar to cylinder 142.

It may be mentioned that the clearances between the ram 146 and the bores of the injection chamber 214 are exaggerated in the drawings, as they are in the case of the other illustrated embodiments.

In the apparatus 100, and as shown in Figure 7, the forward end 230 of the ram is conical in configuration, the conical end surface being at an angle of approximately 45 degrees with respect to the central axis of the ram. In this embodiment of the invention, as the molding material moves forwardly of the ram and sweeps by end 230, the end of the ram is purged or cleaned off by the newly added molding material and there is no dead spot adjacent the center of the end where molding material may collect. While the end of the ram has a 45 degree taper in the illustrated embodiment, which has been found satisfactory under most circumstances, the basic idea is to conform the end of the ram to the lines of flow of the molding material as it sweeps past the end of the ram.

The injection cylinder 142 also comprises a rotary valve body 232 interposed between the main body of the cylinder and the injection cylinder head 234 that in the illustrated embodiment includes a flanged portion 236 and a relatively long neck 238 in the end of which the nozzle 40 is mounted. A novel rotary valve 240 (see Figures 4, 6 and 7) is mounted in the valve body 232.

The valve 240 generally comprises a stem 242 having an enlarged head or inner end 244 that is received in a valve chamber 246 that is formed in the valve body 232. The stem 242 is mounted in a relatively wide, outwardly tapering hole 248 formed in the valve body 232, and the lower rim of the enlarged head portion or end 244 rests on shoulder 250 of the valve body or housing that defines the lower edge of the valve chamber. The head or end 244 of the stem 242 is formed with an inverted U-shaped groove 252 that extends from one side of the stem to the other, and which defines with the surface of chamber 246 a channel 247 that extends from the inlet port 254 of the chamber to the outlet port 256 of the chamber. In the illustrated embodiment, the top surface 249 (see Figure 11) of head or end 244 abuts against the lower end of plug element 258 that forms a top valve seat for the valve. The element 258 is preferably formed with a hole 260 across the bottom of which is fixed a plug or wall 262 of metal having good heat transfer properties, such as nickel, and the lower end of a conventional thermocouple 264 is fixed to this plug, as by brazing or the like. A screw threaded cap 266 preferably holds the plug element 258 in place. The valve body 232 is formed with a tapered orifice 267 which corresponds in configuration to the end 230 of ram 146.

When the stem 242 is positioned so that the channel 247 extends between the inlet and outlet ports of the valve chamber, flow of molding material is permitted through the valve body 232. It will be noted that the flowing molding material is in contact with the plug or wall 262, which provides an extremely accurate way to find the temperature of the molding material at this point. The valve 240 also provides the straight through flow of molding material that I have found so important in injection molding apparatus and the channel 247 is cleaned out each time flow passes through it. The hole 248 is preferably larger than the stem so that the stem will turn easily after the valve body is heated to the required temperature. The pressure of the molding material acting on the surfaces of groove 252 urges the end 244 of stem 242 into sealing engagement with shoulder 250 of valve body 232.

The carriage 110 also carries a micro switch 270 (see Figure 7) of conventional construction that controls the operation of power unit 104 and that is secured to a switch holder 272 fixed to the carriage in any suitable manner and including an upstanding flange 274 that is arranged to be engaged by the end 276 of the coupling 148. The holder 272 is preferably adjustably mounted on the carriage 110 and the flange 274 is likewise preferably adjustably mounted on the holder. The switch 270 includes an arm 278 that is also arranged to be engaged by the end 276 of coupling 148. The arm 278 may be provided with an antifriction roller 278a. The arm 278 and flange 274 are so arranged that as the ram moves rearwardly under the pressure of the molding material being forced into the injection chamber, the end 276 of coupling 148 shuts off the switch 270 adjacent the end of the rearward stroke, but the pressure of the molding material in the passages 175 continues to force the ram rearwardly until the end 276 of coupling 148 contacts the flange 274. This pressure is provided by the screws 164 and the elements of power unit 104, which tend to coast somewhat after the switch 270 has been turned off, and the partial compressibility of the plasticized molding material. Also, the forward motion of the ram is limited by a position stop, for instance, collar 216.

The switch holder 272, the flange 274, the coupling 148, and the collar 216 are preferably so positioned that the ram end 230 is spaced from the surfaces defining orifice 267 sixty thousandths of an inch at its forwardmost position, and to move it backwardly to its rearwardmost position, exactly one shot of molding material is admitted to the injection chamber.

In the illustrated embodiment, the forward end 277 of coupling 148 contacts the extension device 279 of collar 216 to fix the limit of forward movement of the ram. The extension device may comprise a plate 281 adjustably fixed to flange 218 of collar 216 by, for instance, studs 283. The plate has a bore 285 that closely engages the ram and scrapes the surface thereof. The forward movement of the ram may be stopped by other means, for instance, stop means limiting the forward movement of piston 151 or piston rod 150, that will occur to those skilled in the art.

If desired, the switch may include time delay means in its circuit so that the screws 164 turn a short time after the end 276 of coupling 148 contacts flange 274. This will pack the molding material in the space between the ram and the internal surface of the injection cylinder.

The injection cylinder 142 and the neck 238 of head 234 may be provided with suitable heater bands 280, or other appropriate heating means. These elements and the preplasticizer unit are provided with thermocouples 282 located approximately where shown to provide temperature control. It will be noted that the thermocouple 282 mounted in orifice plate 176 is positioned closely adjacent the ends of screws 164, which provides close temperature control at this critical point.

In operation, the molding cycle or "shot" is completed very quickly, and the valve 240, which corresponds to the valve 46 of Figure 2, is operated automatically with the other valves already mentioned. It will be noted that no provision for actuation of check valve 186, which corresponds to the valve 26 of Figure 2, is necessary as its function is automatic without any outside control, other than the direction of flow of molding material.

After the power unit is turned on to actuate screws 164, granular molding material is placed in the hopper from which it is fed by gravity through the hole 178 into the preplasticizing chamber 174. The screws 164, which are turned in opposite directions, work and compress the molding material, and this, together with the heat that is supplied by the heater bands, is effective to plasticize the molding material. The threads of the screws intermesh, as seen in Figure 7, and screws 164 provide a positive feed that gently but thoroughly works the molding compound. The screws force the molding material into orifices 177 and the passages 175, and through the channels of the check valves 186, the lower portions of passages 175 and to ports 226 of the injection chamber.

Assuming that the ram is in its forwardmost, or advanced position, shown in full lines in Figure 4 and in dotted lines in Figure 7, and that the stem 242 of valve 240 is turned ninety degrees from the position shown in Figures 4, 6 and 7, which are the positions of these elements after an injection stroke has been completed, continued operation of the plasticizing unit forces the molding material into the injection chamber where it encounters the material remaining from the previous injection stroke, which fills the channel forming clearance between the ram 146 and the side wall of the cylinder formed by the bore 147. The incoming molding material encounters the surfaces 228 of the projections 224 fixed to collar 216 and is directed toward the tapered forward end of the ram. The molding material is forced along the injection chamber to the end of the ram, which is slightly spaced from the end of injection chamber 214 defined by the orifice 267 of valve body 232 and acts against it to force it to move rearwardly, or to the left in Figure 4, the plastic molding material occupying the space from which the ram is moved. The ram and the piston to which it is attached move rearwardly until the coupling 148 contacts and actuates the switch arm 278 of switch 270, thus turning off the power unit 104 in the illustrated embodiment. The pressure of the molding material continues to move the ram 146 rearwardly until it contacts the flange which stops all rearward movement, by which time a fresh charge equal in amount to a shot has been admitted to the injection chamber 214.

My electrical and positive stop permit a volumetric method of controlling the quantity of injection molding shots which is to be contrasted to the weight scale method. In the weight scale method an amount of unplasticized molding material is weighed out for each shot and then placed in the injection chamber. In accordance with my volumetric method, the volume of molding material forced into the injection cylinder prior to each shot is adjusted to be exactly equal to the volume of molding material that the mold is formed to receive, and each injection molding shot provides this volume or quantity molding material. Thus, my method measures molding material for each shot in its liquid state, and not in its solid state, as in the weight scale method.

In the illustrated embodiment, both the electrical and mechanical or positive stops are required to insure this control of shot quantity. If only the electrical stop were provided, the ram 146 would not stop at the same rearward position each time. If only mechanical stop were employed, the pressures built up in the injection cylinder would become excessive.

It will be noted that the flow of molding material through the injection cylinder 214 is always in the same direction, that is, to the front or discharge end of the cylinder, as it is in the cylinder of Figures 1 and 2, and encounters no eddy or stilled pool forming obstructions. The incoming molding material acts to wipe off any molding material tending to adhere to the end of the ram, and as the end of the ram is formed to roughly conform to the lines of flow of the molding material as it sweeps by the end of the ram, a complete cleaning off of the ram end is assured. Thus, in the apparatus 100, flow of the molding material is progressive and constant toward the discharge end of the injection cylinder, and this precludes the possibility of stationary pockets or pools forming which would become charred in a short time.

The back pressure against which the ram operates is controlled in the manner described in connection with the embodiment of Figures 1 and 2. The provided restricted opening 219 between the collar and ram operates to permit the escape of gases and air entrapped in the molding material. The plate 281 of device 279 cleans off ram 146 during its rearward movement.

After the collar 148 has been backed against the flange 274, the valve 240 is opened and hydraulic fluid under pressure is admitted to the cylinder as in the embodiment of Figures 1 and 2. The hydraulic pressure acting on the piston moves the injection ram forward, forcing the molding material through the valve 240 and the channel formed in the cylinder head 234 into and through the nozzle 40 and thence to the mold. As the collar 148 moves away from flange 274, the switch arm 278 is disengaged which turns on the switch 170 and screws 164 commence to rotate. The injection pressure of the ram on the molding material closes check valve 186. After the ram reaches the end of its forward or mold charging stroke, that is, when end 277 of coupling 148 contacts plate 281 in the illustrated embodiment, the pressure applied to the molding material in passages 175 is sufficient to open check valve 186 and to return the ram to its rearward position, as before. The forward motion of the ram is stopped by plate 281, which spaces the end 230 of the ram slightly from the end of the injection chamber. This positive stop also provides a form of what is known in the art as "starved" feeding, wherein the pressure of the ram on the molding material ends at the end of the stroke.

On initially filling the injection cylinder with molding material, the molding material pushes the air before it and out of nozzle 40, as in the case of the apparatus 8. After molding material appears at nozzle 40, one or two shots should be made before production begins.

Figures 13–16 illustrate a modified form 300 of the invention in which the need for a check valve between the preplasticizing chamber and the injection chamber is eliminated. The apparatus 300 generally comprises twin screw preplasticizing apparatus 302 generally similar to the preplasticizing apparatus of Figures 3–12 and an injection ram and cylinder apparatus 303. The bearings for the twin screws 304 and the power unit for operating these screws are enclosed in a single housing 306. The apparatus 302 includes a hopper 308 mounted on a housing 310 providing a preplasticizing chamber 312 through which the screws 304 extend and terminate in the converging mouth or orifice 313 of a single feed passage 314 formed in the orifice plate 316 and the housing element 317. The passage 314 leads to an injection chamber 318 formed by the bores of housing element 317 and the sleeve like tube 320 fixed to the upper surface of element 317. An injection ram 322 is reciprocably mounted in the injection chamber 318 and is actuated by piston and cylinder means 324. The ram may include a head 326 guided by tie rods 328.

The passage 314 terminates in an inlet port 330 formed in the side wall of the injection cylinder, which side wall is also formed with an outlet port 332 that leads to the passage 334 through the cylinder head and neck element 336 and thence to a nozzle 40 and a mold 340, one portion of which is mounted on stationary platen 342 and the other portion of which is mounted on movable platen 343.

A rotary valve 344 is mounted in the lower end of the injection chamber 312, and comprises a stem 346 rotatably mounted in the housing element 317, said stem 346 having an enlarged head or end 348 that is received in and substantially fills the lower end of the injection chamber. The hole 347 in which stem 346 is received diverges outwardly and is shaped similarly to hole 248 formed in valve body 232 of Figure 4. The enlarged head or end 348 is preferably substantially the same size as this portion of the injection chamber so that it seals off the ports 330 and 332. One side of the head or end 348 is cut away to provide a flow directing surface 350 for a purpose now to be described. It will be noted that the enlarged head or end 348 is so formed that it will place inlet port 330 in communication with injection chamber 318 in one position of the valve, while 180 degrees rotation of the valve will seal off the inlet port and put the outlet port 332 in communication with the injection chamber. The head or end 348 rests on the shoulder 352 formed by the hole 347 at the end of the injection chamber.

In operation, pelletized molding material is placed in the hopper 308, and fed by gravity into the preplasticizing unit 302 which plasticizes it and feeds it under pressure into the passage 314. On the intake stroke, the valve is positioned as shown in Figure 13, and the ram is forced upwardly as molding material is pushed into the injection chamber 318. When the upper limit of the ram is reached, the valve 346 is rotated 180 degrees to close off the inlet port and place the injection chamber 318 in communication with the outlet port 332 and the passage 334. The piston and cylinder means 303 is then actuated to force the ram downwardly, whereupon a "shot" of molding material is fed into the mold through the nozzle 40.

It will be noted that the apparatus 300 provides another form of "straight through" flow, though the flow of the molding material reverses directions in the injection chamber 318. The flow of material is such that incoming molding material forces molding material ahead of it along through the apparatus, without dead pockets or pools forming which would char after a short time.

The downward stroke of the ram 322 preferably ends with the ram end 360 in contact with the plane surface 362 of the enlarged head or end 348 of stem 346. The stem is then rotated to the position of Figure 13 for the intake step, which cleans off the end of the ram at the same time. As the operation of the apparatus is relatively fast, the valves for operating the piston and cylinder means 324 and the valve 344 are arranged for automatic operation. The piston and cylinder means 324 may be arranged in a manner similar to that shown in Figure 1 and the injection chamber 318 provided with bores 361 and 363, similar to bores 42 and 52 of Figures 1 and 2 so that gas and air entrapped in the plasticized molding material may be removed in the manner described in connection with the embodiment of Figures 1 and 2. It should be noted that the incoming molding material that returns the ram to its uppermost, or rearward position in the machine cycle, enters the injection chamber 318 at its forward end, rather than its rearward end, as in the embodiments of Figures 1–12.

The apparatus 300 is provided with suitable heater bands 365 or the like approximately where shown and thermocouples 366 approximately where shown. Preferably the apparatus 300 includes a positive stop for limiting the upward or rearward movement of the ram and a switch for shutting off the preplasticizing unit 302, as well as a positive stop that stops downward or forward movement of the ram 322 when the ram contacts the surface 362 of valve stem 346. These stops provide the volumetric control described hereinbefore.

The illustrated embodiments of the invention are particularly adapted for use with the compound polyvinyl chloride, though are not limited to use with this compound.

The illustrated embodiments provide means for controlling the temperature of the molding material so that the adverse effects of too high or too low temperatures can be avoided. In operation of these embodiments, it is desirable that the final temperature high not be reached until just prior to injection. The heaters and thermostats of all the illustrated embodiments may be connected in conventionl circuits to provide the coaction desired.

The illustrated embodiments of the invention provide the things which I have found to be necessary in a successful method and apparatus for injection molding. Means are provided for cleaning off molding material from the ram, both by flow of molding material and by scraper elements. The aforementioned straight line flow is provided, and it will be noted that all passages and chambers in the illustrated apparatus are shaped to substantially conform to the lines of flow of the molding compound as it is forced through the apparatus. The molding compound beyond the hoppers of each embodiment is in relatively thin films or streams so that all portions of the films or streams are of uniform temperature.

Additionally, the embodiments of Figures 3–16 provide means for mechanically working the molding material as it is being plasticized, something that I have found to be quite important in handling polyvinyl chloride. This working of the compound has a shearing effect that appears to break down and regroup the molecular groups making up the compound and provides a more satisfactory product. Also, the working during the heating process helps get the heat into the molding material.

The foregoing description and the drawings are given merely to explain and illustrate my invention, and the manner in which it may be performed, and the invention is not to be limited thereto, except insofar as the appended claims are so limited since those skilled in the art who have my invention before them will be able to make modifications and variations therein within without departing from the scope of the invention.

I claim:

1. Injection molding apparatus comprising an injection cylinder defining an injection chamber, an injection ram reciprocably mounted in said chamber, means defining a preplasticizing chamber, conduit means extending between said cylinder and said preplasticizing chamber, means for forcing plasticized molding material from said preplasticizing chamber through said conduit means and into said injection chamber, and check valve means interposed in said conduit means, said check valve means comprising a tear shaped fluid flow blocking element slidably mounted in said conduit means, said conduit means defining a tear shaped chamber for receiving said element with the inlet to said tear shaped chamber being positioned in the enlarged portion thereof and the outlet from said chamber being positioned in the converging portion thereof, said element and the adjacent portion of said conduit means defining a channel extending between the enlarged portion of said element and said tear shaped chamber outlet, said channel being in communication with said tear shaped chamber inlet only when the enlarged end of said element is spaced from the enlarged end of said tear shaped chamber.

2. Injection molding apparatus comprising an injection cylinder, an injection ram, means forming a preplasticizing chamber, conduit means extending between said chamber and said cylinder, means for forcing plasticized molding material from said chamber into said cylinder, and check valve means interposed in said conduit means comprising housing means defining a valve chamber having a concavely rounded portion adjacent the inlet thereto and a converging portion adjacent the outlet therefrom and a tear-shaped blocking element mounted in said valve chamber for movement toward and away from said rounded portion of said valve chamber, said element being formed with a convexly curved portion adapted to engage said concave portion of said valve chamber to cut off flow into said valve chamber, said element and said housing means being formed to define a channel extending between said rounded portion of said element and said valve chamber outlet.

3. An injection molding apparatus comprising an injection cylinder defining an injection chamber, an injection ram mounted for reciprocation in said chamber, said ram being movable toward and away from one end of said chamber, outlet means formed in said cylinder adjacent said one end of said chamber, inlet means formed in said cylinder adjacent the other end of said chamber, said ram and said cylinder being formed to define a channel extending between said inlet means and the inner end of said ram in its innermost position in said chamber, preplasticizing means for preplasticizing molding material, conduit means extending between said preplasticizing means and said inlet means, said preplasticizing means including means for forcing plasticized molding material under pressure through said conduit means and said inlet means and into said channel to move said ram from a forward position in said cylinder to a rearward position therein, and check valve means interposed in said conduit means, said check valve means comprising a valve chamber formed in said conduit means, said valve chamber including a concavely rounded portion adjacent and about the inlet thereto and a converging portion leading to the outlet therefrom, and a tear-shaped flow blocking element mounted in said chamber for movement toward and away from said rounded portion of said valve chamber, said element being formed with a convexly curved portion adapted to engage said concave portion of said valve chamber, said element and said conduit means defining a channel extending between the rounded portion of said element and said converging portion of said valve chamber, whereby, when the molding material backs up into said valve chamber, said rounded portion of said element is urged against said rounded portion of said valve chamber to cut off flow of molding material upstream of said valve chamber.

4. In injection molding apparatus including an injection cylinder defining an injection chamber, an injection ram adapted to reciprocate in said chamber, a channel between said ram and the walls of said chamber through which plasticized molding material may flow when said ram is in a forward position in said chamber, and means associated with said injection chamber for supplying plasticized molding material under pressure to said injection chamber through said channel to move said ram from its forward position in said chamber to a rearward position, the improvement wherein the forward end of said ram is shaped to conform to the lines of flow of the molding material about it as the ram is moved from its forward position in the chamber to its rearward position.

5. Injection molding apparatus comprising housing means defining a cylindrical injection chamber, an injection ram mounted for movement toward and away from one end of said chamber, said housing means defining inlet and outlet conduit means terminating at inlet and outlet ports adjacent said one end of said chamber, said ports being formed in the side wall of said chamber, means for supplying plasticized molding material under pressure to said inlet conduit means, and a generally cylindrical valve element rotatably mounted in said chamber, said element comprising a body having a diameter which is complementary to that of said chamber, said body being proportioned to cover said ports and to respectively seal same from said chamber and each other, one side of said body being excised to provide communication between one of said ports and said chamber when said side of said body is positioned adjacent thereto, whereby, when said side of said body is positioned adjacent said inlet port, plasticized molding material is admitted under pressure to said chamber, and said outlet port is sealed, and when said side of said body is positioned adjacent said outlet port, the plasticized molding material admitted to said chamber may be ejected by said ram and said inlet port is sealed.

6. The apparatus set forth in claim 5 wherein the head of said ram and the end of said body are formed with complementary surfaces, said ram head engaging said end of said body at the end of its injection stroke and said body acting to clean off said head of said ram when said body is rotated to position said side thereof adjacent said inlet port.

7. An injection molding apparatus comprising an injection cylinder defining an injection chamber, an injection ram mounted for reciprocation in said chamber, said ram being movable toward and away from one end of said chamber, outlet means formed in said cylinder at said one end of said chamber, inlet means formed in said cylinder adjacent the other end of said chamber, said ram and said cylinder being formed to define a channel extending between said inlet means and the inner end of said ram in its innermost position in said chamber, preplasticizing means for preplasticizing molding material, said preplasticizing means including a housing defining a plasticizing chamber and screw means operable in said plasticizing chamber, conduit means extending between said preplasticizing means and said inlet means, said screw means of said preplasticizing means forcing plasticized molding material under pressure through said conduit means and said inlet means and into said channel to move said ram from a forward position in said cylinder to a rearward position therein, check valve means interposed in said conduit means, said check valve means comprising a valve chamber formed in said conduit means, said valve chamber including a concavely rounded portion adjacent and about the inlet thereto and a converging portion leading to the outlet therefrom, and a tear-shaped flow blocking element mounted in said valve chamber for movement between said portions of said valve chamber, said element being formed with a convexly curved portion adapted to engage said concave portion of said valve chamber, said element and said conduit means defining a channel extending between the rounded portion of said element and said converging portion of said valve chamber, whereby, when the molding material backs up into said valve chamber, said rounded portion of said element is urged against said rounded portion of said valve chamber to cut off flow of molding material upstream of said valve chamber, and rotary valve means interposed in said outlet means of said cylinder, said rotary valve means comprising a rounded stem having a groove formed across the top thereof, said stem extending across the passage defined by said outlet means, said stem being rotatably mounted in a rounded chamber and engaging the internal surface of said chamber in the area of said passage, said groove defining with the internal surface of said chamber a channel extending between the upstream side of said stem and the downstream side of said stem, said rotary valve permitting flow of molding material when the last mentioned channel is aligned with said passage but blocking said flow when said stem has been rotated to position said last mentioned channel out of alignment with said passage.

8. Injection molding apparatus comprising an injection cylinder, an injection ram reciprocably mounted therein, housing means forming a preplasticizing chamber having an outlet formed in one end thereof, screw means extending through said chamber between said one end thereof and the other end thereof, conduit means extending between said outlet and said cylinder, means for rotating said screw means, means for heating said chamber, whereby plasticized molding material is forced through said outlet and said conduit means and into said cylinder, said cylinder being provided with nozzle means, means for moving said ram toward said nozzle means to provide an injection stroke, said cylinder and said ram defining channel means extending between said conduit means and the forward end of said ram in the forward position of same, said plasticized material moving said ram away from said nozzle means as said material is forced into said cylinder by said screw means to provide a return stroke, and means for controlling the movement of said screw means and said ram comprising means for rendering ineffective said screw rotating means when said ram has moved a predetermined distance rearwardly from said nozzle means on the return stroke thereof and positive stop means for ceasing rearward movement of said ram away from said nozzle means after said ram has moved a further predetermined distance, and including stop means for stopping forward movement of the ram on the injection stroke and spacing same a predetermined distance from the forward end of said cylinder.

9. In an injection assembly for injection molding apparatus including an injection cylinder defining an injection chamber, an injection ram mounted for reciprocating movement in the chamber, said ram being movable toward and away from one end of said chamber, nozzle means formed in said one end of said chamber, inlet means formed in the cylinder adjacent the other end of the chamber, channel means defined by a diameter differential between the ram and the chamber and extending between said inlet means and the forward end of the ram, and means for forcing plasticized molding material under pressure into said inlet means and through said channel means to move said ram from a forward position in the cylinder to a rearward position therein, the improvement wherein said inlet means includes a pair of diametrically opposed ports in communication with said channel means, and wherein flow directing means is interposed in said channel means on either side of the ram and between said ports, said flow directing means comprising spaced projections tapering from maximum to minimum dimensions in the direction of the forward end of the ram.

10. Injection molding apparatus comprising a cylinder defining an injection chamber, an injection ram reciprocably mounted in said chamber, said cylinder including nozzle means, means for admitting molding material to said chamber, said cylinder being formed with an outlet port, conduit means extending between said port and said nozzle means, means for moving said ram toward said outlet port for forcing molding material into said outlet port, rotary valve means interposed in said conduit means, said rotary valve means comprising a rounded stem having a groove formed across the top thereof, said stem extending across the passage defined by said conduit means, said stem being rotatably mounted in a rounded chamber and engaging the internal surface of said chamber in the area of said passage, said groove defining with the internal surface of said chamber a channel extending between the upstream side of said stem and the downstream side of said stem, said valve permitting fluid flow to said port when said channel is aligned with said passage but blocking fluid flow when said stem has been rotated to position said channel out of alignment with said passage, and thermocouple means positioned closely adjacent said channel.

References Cited in the file of this patent

UNITED STATES PATENTS

| Number | Name | Date |
|---|---|---|
| 2,144,952 | Williams et al. | Jan. 24, 1939 |
| 2,315,758 | Willits | Apr. 6, 1943 |
| 2,341,692 | Clade | Feb. 15, 1944 |
| 2,359,840 | Goessling | Oct. 10, 1944 |
| 2,465,889 | Lester et al. | Mar. 29, 1949 |
| 2,479,433 | Tucker | Aug. 16, 1949 |
| 2,487,436 | Goehring | Nov. 8, 1949 |
| 2,508,495 | Consalvo | May 23, 1950 |
| 2,615,199 | Fuller | Oct. 28, 1952 |
| 2,617,169 | Bodkin | Nov. 11, 1952 |
| 2,621,886 | Mueller | Dec. 16, 1952 |
| 2,629,132 | Willcox et al. | Feb. 24, 1953 |
| 2,661,926 | Resek | Dec. 8, 1953 |
| 2,705,342 | Hendry | Apr. 5, 1955 |
| 2,719,326 | Dykehouse | Oct. 4, 1955 |
| 2,734,226 | Willert | Feb. 14, 1956 |
| 2,737,686 | Harkenrider | Mar. 13, 1956 |
| 2,831,214 | Eyles et al. | Apr. 22, 1958 |